United States Patent
Birk et al.

(10) Patent No.: US 9,036,232 B2
(45) Date of Patent: May 19, 2015

(54) DEVICE FOR SCANNING AN OBJECT, METHOD FOR OPERATING THE DEVICE AND SCANNING MICROSCOPE

(75) Inventors: Holger Birk, Meckesheim (DE); Bernd Widzgowski, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 258 days.

(21) Appl. No.: 13/578,609

(22) PCT Filed: Jan. 3, 2011

(86) PCT No.: PCT/EP2011/050008
§ 371 (c)(1),
(2), (4) Date: Sep. 21, 2012

(87) PCT Pub. No.: WO2011/098303
PCT Pub. Date: Aug. 18, 2011

(65) Prior Publication Data
US 2013/0010340 A1 Jan. 10, 2013

(30) Foreign Application Priority Data
Feb. 12, 2010 (DE) .......................... 10 2010 007 729

(51) Int. Cl.
*G02B 26/08* (2006.01)
*G02B 26/10* (2006.01)
*G02B 21/00* (2006.01)

(52) U.S. Cl.
CPC ............ *G02B 26/101* (2013.01); *G02B 21/002* (2013.01); *G02B 26/0875* (2013.01)

(58) Field of Classification Search
CPC .... G02B 21/00; G02B 26/101; G02B 26/105; G02B 27/48; G02B 27/141; G02B 26/0858; A61B 1/00096
USPC ................................. 359/196.1, 198.1, 200.7
See application file for complete search history.

(56) References Cited

U.S. PATENT DOCUMENTS

| 5,179,276 | A | 1/1993 | Hakamata |
| 5,880,465 | A | 3/1999 | Boettner et al. |
| 7,242,485 | B2 * | 7/2007 | Akishiba ...................... 356/614 |
| 2006/0007534 | A1 | 1/2006 | Fukuyama et al. |
| 2009/0015894 | A1 | 1/2009 | Rosman et al. |

FOREIGN PATENT DOCUMENTS

| JP | 05127089 A | 5/1993 |
| JP | 07325262 A | 12/1995 |
| JP | 2003507777 A | 2/2003 |
| WO | 01/15193 | 3/2001 |
| WO | 2008/050254 | 5/2008 |
| WO | 2009/040745 | 4/2009 |
| WO | 2009040745 A1 | 4/2009 |

* cited by examiner

*Primary Examiner* — Euncha Cherry
(74) *Attorney, Agent, or Firm* — Hodgson Russ LLP

(57) ABSTRACT

The invention relates to a device for scanning an object comprising a carrier body (10) and a first electromagnetic drive (2). The carrier body (10) is movably mounted in a plane and holds an optical element (12) that focuses an illuminating light beam (19) on a first object plane of the object that is parallel to the plane. The first electromagnetic drive (2) moves the carrier body (10) with the optical element (12) and a focus region (23) of the illuminating light beam (19) within the first object plane.

12 Claims, 5 Drawing Sheets

Figure 1:
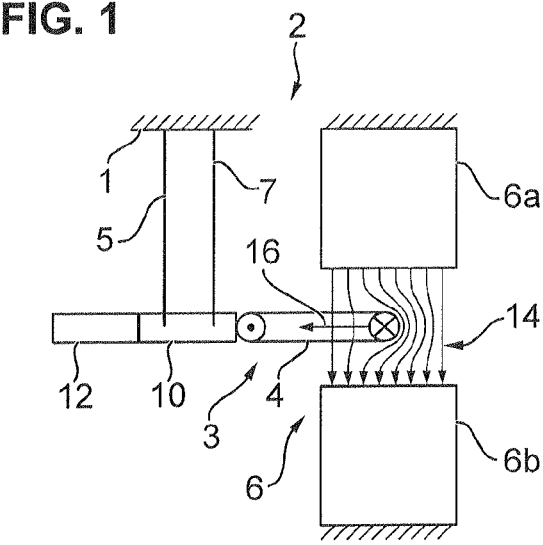

DEVICE FOR SCANNING AN OBJECT, METHOD FOR OPERATING THE DEVICE AND SCANNING MICROSCOPE

CROSS-REFERENCE TO RELATED APPLICATIONS

The present application is the U.S. national phase of International Application No. PCT/EP2011/050008 filed Jan. 3, 2011, which claims priority of German Application No. 10 2010 007 729.1 filed Feb. 12, 2010, the entirety of which is incorporated herein by reference.

FIELD OF THE INVENTION

The invention relates to a device for scanning an object. The device has a carrier body and a first electromagnetic drive. The invention further relates to a method for operating the device for scanning an object and a scanning microscope.

BACKGROUND OF THE INVENTION

A scanning microscope for examining an object, particularly a sample, basically has at least one light source that produces an illuminating light beam. The illuminating light beam is deflected by means of a scanning unit and then focused on the object with the aid of a focusing lens system. In known scanning microscopes the scanning unit has two or more reflectors that can be adjusted by means of positioning elements associated with the reflectors. The adjustment of the reflectors enables a focus region that may be in the form of a point or line, for example, to be moved on or in the object. Preferably, during the scanning of the object, the focus region is moved within a scanning field such that the entire scanning field can be optically scanned. Detection beams emanating from the object and formed for example by fluorescence effects in the illuminated region of the object can then be deflected onto a detector unit.

SUMMARY OF THE INVENTION

The problem of the invention is to provide a device for scanning an object, a method for operating the device and a scanning microscope, which enable an object to be scanned and thus optically detected at low cost.

The problem is solved by the features of the invention described herein. Advantageous embodiments are recited in the present specification.

The invention is characterised in that the carrier body is movably mounted in a plane and holds an optical element that focuses an illuminating light beam on a first object plane of the object that is parallel to the plane. The first electromagnetic drive moves the carrier body with the optical element and, within the first object plane, a focus region of the illuminating light beam. The carrier body meanwhile is moved with the optical element transversely with respect to a center axis of the illuminating light beam in a reference position of the illuminating light beam.

Preferably, the carrier body is moved with the optical element and hence the focus region is moved in two different directions within the plane. This serves to scan a given scanning field on or within the object. The object is preferably a sample, particularly a tissue sample. The reference position of the illuminating light beam is any desired fixedly predefined position of the illuminating light beam. If for example the illuminating light beam itself is movable, for example by being directed on to the optical element, through an at least partially movable optical fibre, the reference position of the illuminating light beam is predefined by a reference position of the movable part of the optical fibre. Alternatively, the optical element may be the optical fibre and enable the illuminating light beam to move. The reference position is then predefined by a reference position of the carrier body, for example the position that the carrier body assumes in the current-free state of the actuator assembly.

A particularly precise suspension of the carrier body is obtained in a preferred embodiment by means of a parallel spring arrangement. The parallel spring arrangement comprises for example two or more parallel spring linkages. One or more of the parallel spring linkages may be used as a current supply line for the electromagnetic drive. This does away with the need for separate cables for the power supply. Moreover, the parallel spring linkages may have two different spring constants for flexural stress in two different directions, so that the system comprising the carrier body and parallel spring linkages has different inherent frequencies (eigenfrequency) in different directions of movement. As a result the system can be excited to resonant vibrations in both directions independently of one another.

In a preferred embodiment, the carrier body comprises a printed circuit board or is formed therefrom, while at least one drive component of the first electromagnetic drive is formed on the printed circuit board. Thus the carrier body performs a dual function, in that the carrier body carries the optical element and at the same time forms a base for the drive components.

In another preferred embodiment the first electromagnetic drive comprises as the first drive component a coil arrangement and as the second drive component a magnetic field arrangement that generates at least one magnetic field. The coil arrangement or the magnetic field arrangement are both connected to the carrier body, while the one of the two drive components that is not connected to the carrier body is arranged in a fixed position. The magnetic field arrangement may have one or more magnetic elements that generate the magnetic field. The magnetic elements may be coil leads that are wound to form one or more coils, and/or permanent magnets.

The present position of the carrier body can be determined easily and precisely at any time by means of a position sensor that detects the position of the carrier body.

The invention further relates to a scanning microscope that comprises a light source and the device for scanning the object.

BRIEF DESCRIPTION OF THE DRAWING VIEWS

Figure 2:
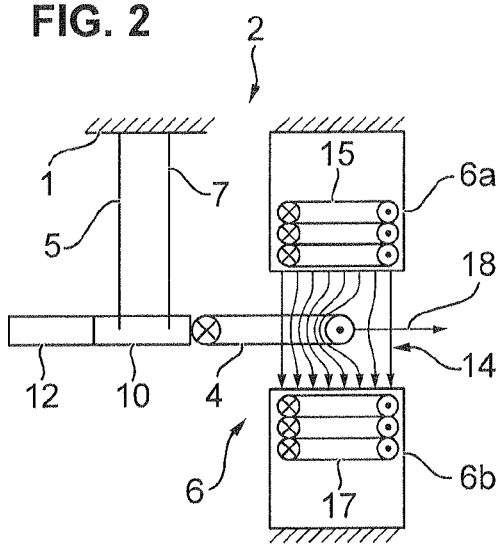
Figure 3:
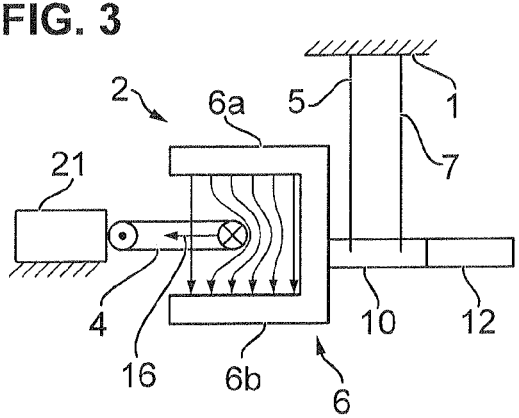
Figure 4:
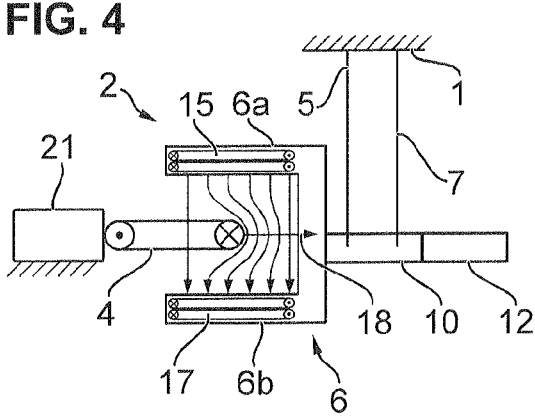
Figure 5:
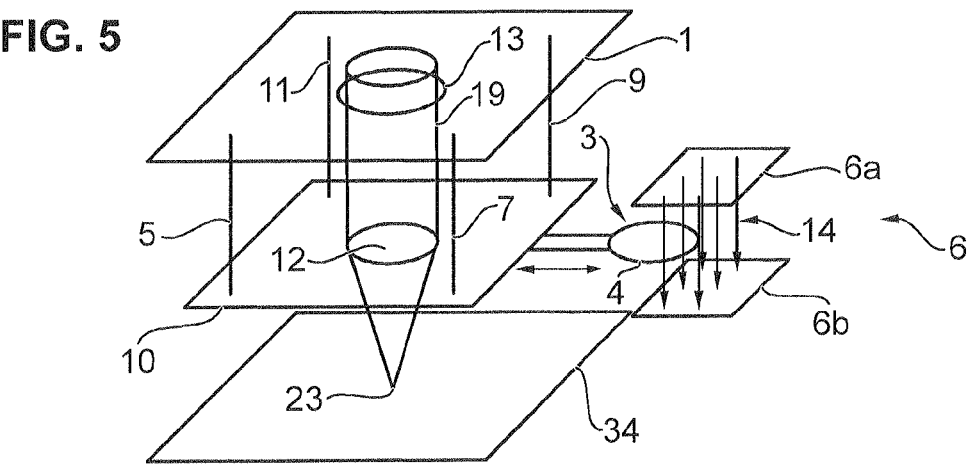
Figure 6:
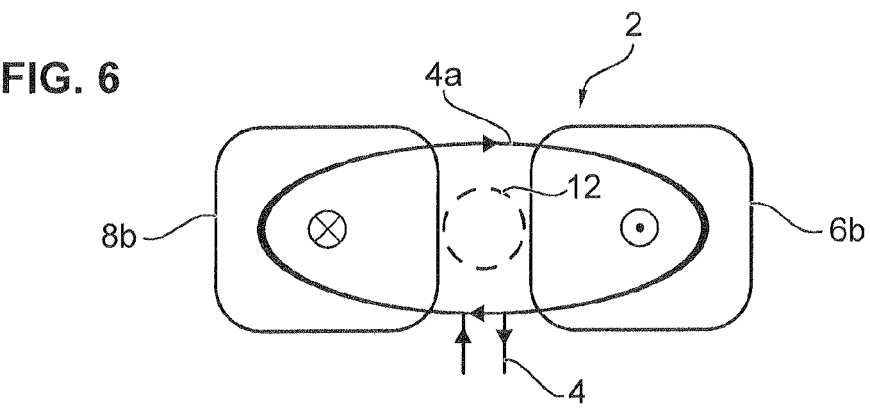
Figure 7:
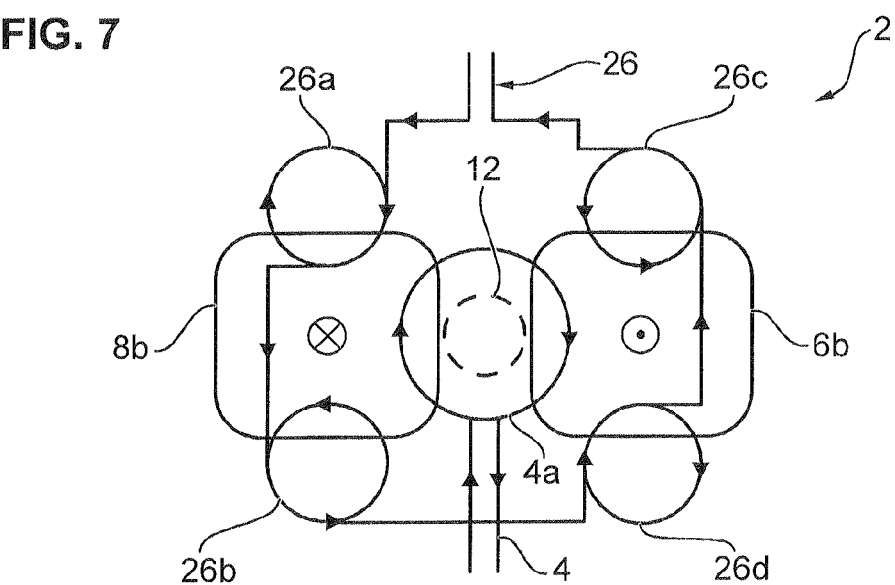
Figure 8:
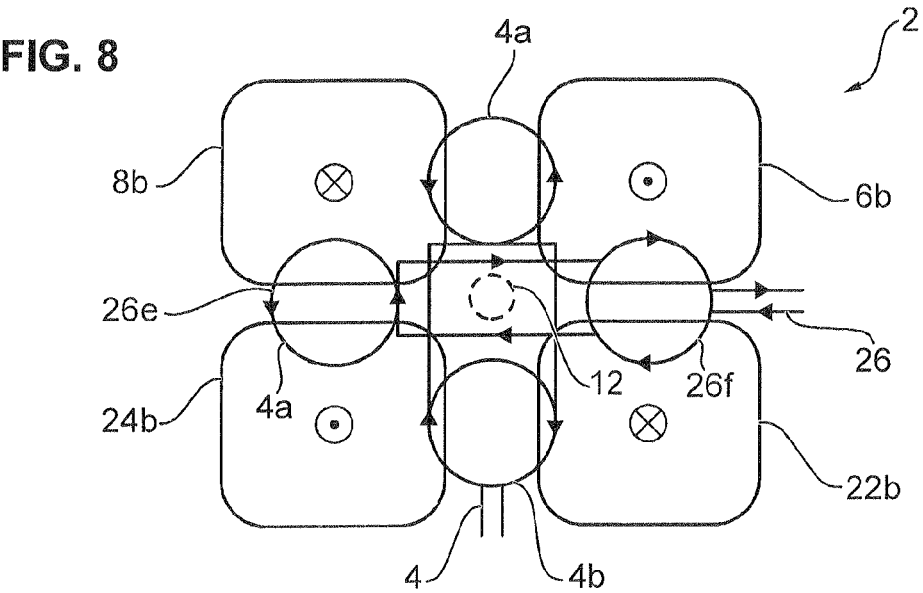
Figure 9:
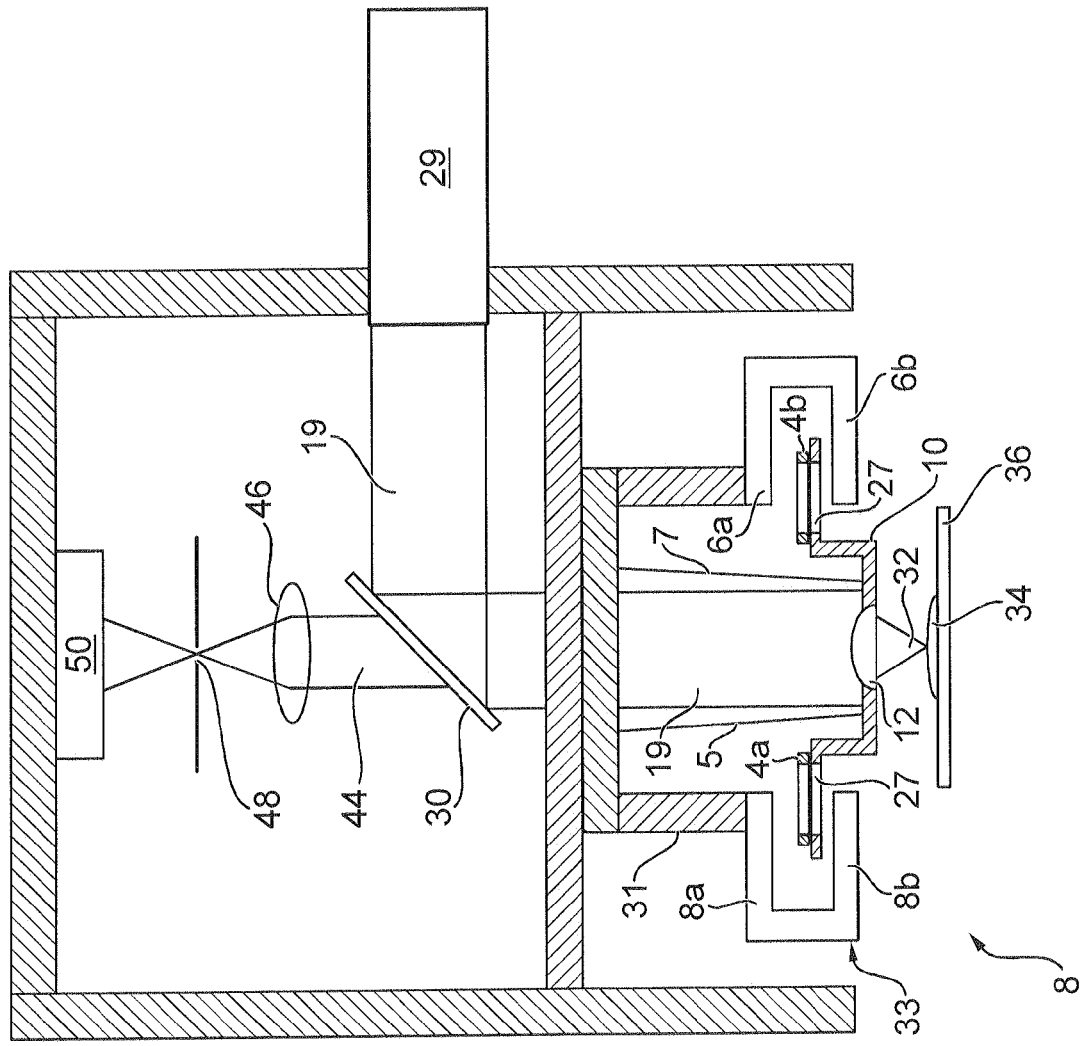
Figure 10:
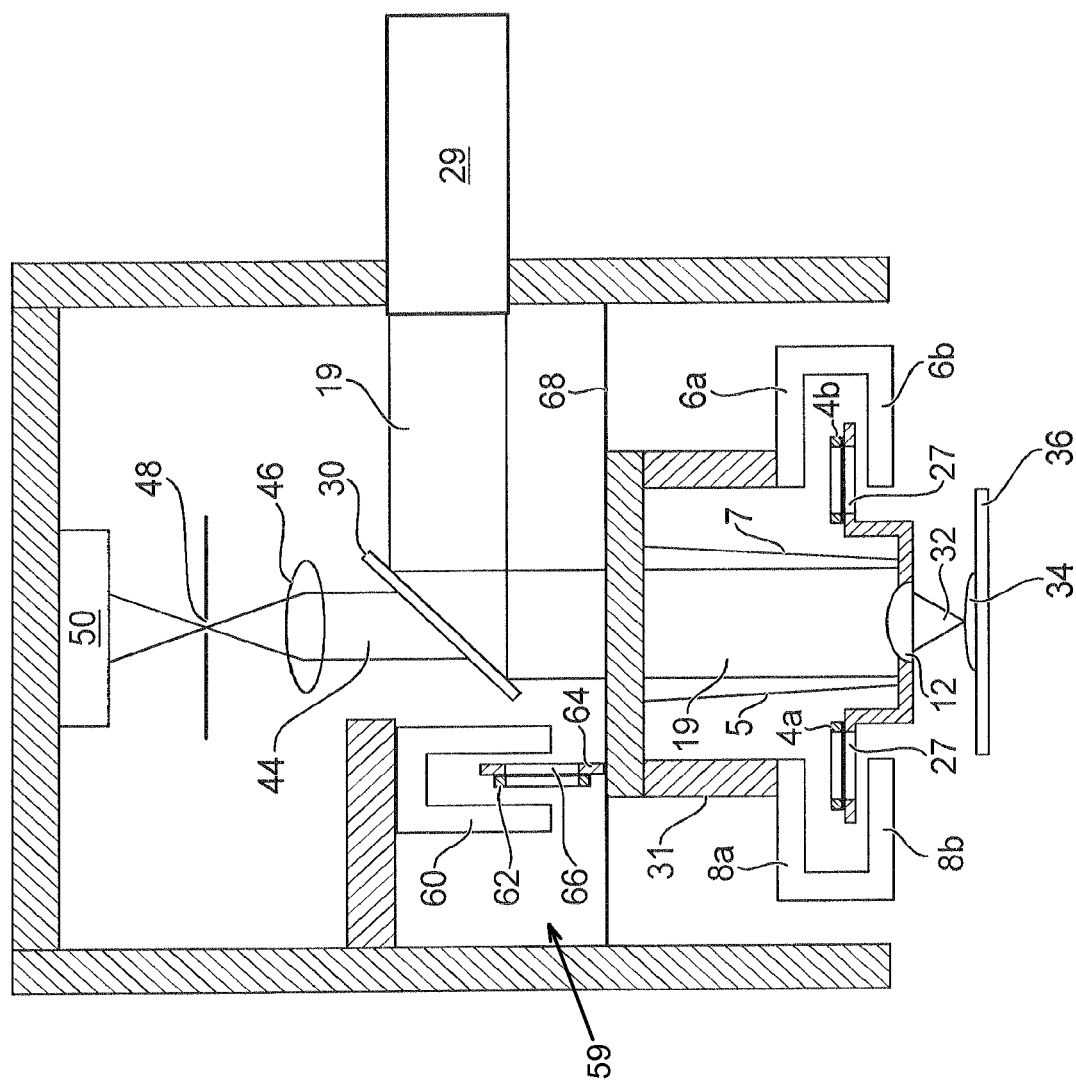
Figure 12:
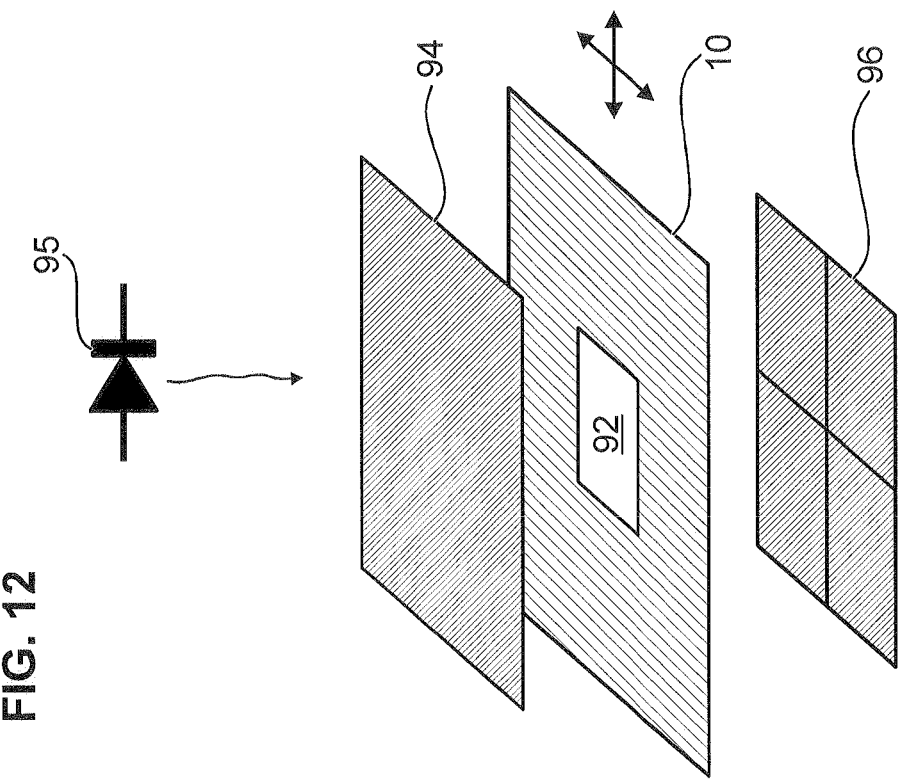
Figure 11:
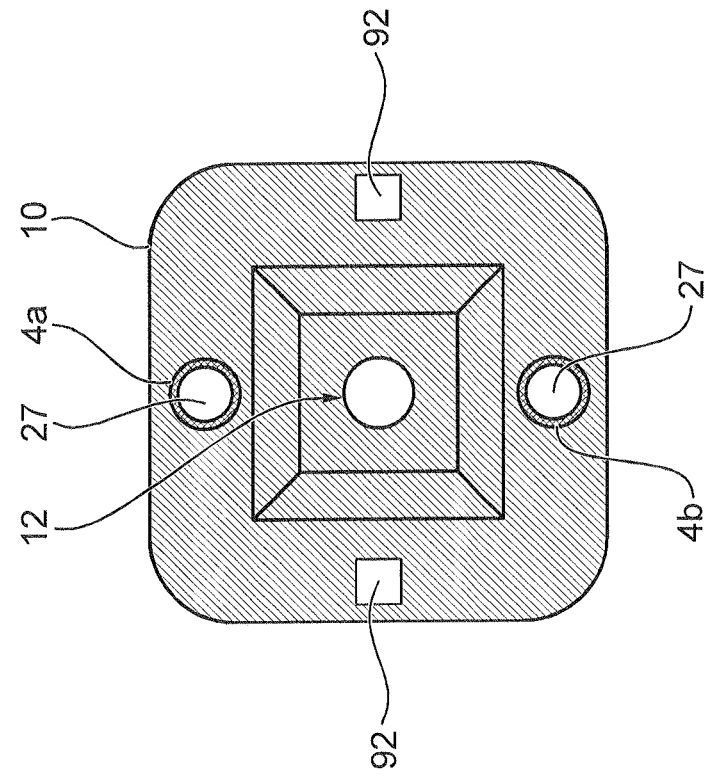

Embodiments of the invention by way of example are described more fully hereinafter by means of schematic drawings, wherein:

FIG. 1 shows a first embodiment of an electromagnetic drive in a first operating state, FIG. 2 shows the first embodiment of the electromagnetic drive in a second operating state, FIG. 3 shows a second embodiment of the first electromagnetic drive in the first operating state, FIG. 4 shows the second embodiment of the first electromagnetic drive in the second operating state, FIG. 5 shows a device for scanning an object, FIG. 6 is a plan view of a third embodiment of the first electromagnetic drive, FIG. 7 is a plan view of a fourth embodiment of the first electromagnetic drive, FIG. 8 is a plan view of a fifth embodiment of the first electromagnetic drive, FIG. 9 shows a first embodiment of a scanning microscope, FIG. 10 shows a second embodiment of the scanning microscope, FIG. 11 is a plan view of a carrier body of the device for scanning the object, and FIG. 12 is a representation of the operating principle of a position sensor.

DETAILED DESCRIPTION OF THE INVENTION

Elements having the same construction or function are designated by the same reference numerals across different Figures.

FIG. 1 shows a first embodiment of a first electromagnetic drive 2 in a first operating state. The first electromagnetic drive 2 has a coil arrangement 3 and a magnetic field arrangement 6 and can also be termed an actuator assembly. The coil arrangement 3 comprises a first coil lead 4. The magnetic field arrangement 6 comprises an upper first magnetic field element 6a and a lower first magnetic field element 6b. The first coil lead 4 is fixedly coupled to a carrier body 10 which carries a focusing lens system 12 and is suspended from a holder 1 via a first spring element 5 and a second element 7. The two spring elements 5, 7 are parallel spring linkages and form part of a parallel spring arrangement by means of which the carrier body 10 and the focusing lens system 12 connected thereto are movably mounted in a plane. At least one of the two spring elements 5, 7 is used as a current supply lead for the coil arrangement 3.

The magnetic field arrangement 6 generates a first magnetic field, the magnetic field lines 15 of which, in FIG. 1, point from the top downwards. In the first operating state the flux of current in the first coil lead 4 is directed anticlockwise. This exerts a first force on the coil lead 4 and hence on the carrier body 10 and the focusing lens system 12. The first force presses the carrier body 10 out of the magnetic field according to a first force vector 16. The first force is produced by the Lorentz force acting on the moving charge carriers in the first coil lead 4.

FIG. 2 shows the same embodiment of the first electromagnetic drive 2 as FIG. 1, except that the drive is in a second operating state in which the flux of current through the first coil lead 4 is in the opposite direction, compared with the first operating state, namely clockwise. In this second operating state, the coil arrangement 3 and hence the carrier body 10 with the focusing lens system 12 are pulled towards the magnetic field. FIG. 2 also shows a cross-section through the upper first and lower first magnetic element 6a, 6b, which in this embodiment comprise a first and second magnetic coil 15, 17, respectively. Alternatively, permanent magnets may be provided in the magnetic elements.

FIG. 3 shows a second embodiment of the electromagnetic drive in which the first coil lead 4 is secured in position by means of a coil holder 21 and wherein the magnetic field arrangement 6, particularly the upper and lower first magnetic elements 6a, 6b are attached to the carrier body 10. In this embodiment, too, the current in the first coil lead 4 flows anticlockwise in the first operating state and exerts a force on the coil lead 4 corresponding to the first magnetic force vector 16. However, as the coil lead 4 is fixed in this embodiment, the magnetic field arrangement 6 together with the carrier body 10 and the focusing lens system 12 is pressed in the direction away from the coil holder 21.

FIG. 4 shows the second embodiment of the first electromagnetic drive 2 in the second operating state, in which the direction of flow in the first coil lead 4 is opposite to that of the first operating state. The result of this is that a force acts on the first coil lead 4 towards the magnetic field arrangement 6 or away from the magnetic field arrangement 6 to the first coil lead 4, as a result of which the carrier body 10 with the focusing lens system 12 is moved towards the coil holder 21. In this embodiment, too, the magnetic elements 6a, 6b are embodied by coils. Alternatively, permanent magnets may also be provided.

FIG. 5 shows a preferred embodiment in which, in addition to the first and second spring elements 5, 7, a third spring element 9 and a fourth spring element 11 are provided. The spring elements 5, 7, 9, 11 hold the carrier body 10 so that it is movably mounted in a plane together with the focusing lens system 12. In the event of minor deflections of the carrier body 10, which are normal during operation, the carrier body 10 moves so slightly in the direction perpendicular to the plane that this movement is negligible. The spring elements 5, 7, 9, 11 are embodied such that the carrier body 10 is able to move in two directions but cannot rotate. In addition, the spring elements 5, 7, 9, 10 are embodied such that the entire system comprising the carrier body and spring elements 5, 7, 9, 11 has a different inherent frequency or eigenfrequency in a first direction within the plane, for example the x direction, than in a second direction within the plane, for example the y direction. In particular, the spring elements 5, 7, 9, 11 may have two different spring constants when subjected to flexural stress in two different directions. Thus, the movement in the x direction and/or in the y direction may be of a resonant nature, as a result of which the scanning speed and/or a scanning amplitude can be significantly increased compared with the non-resonant excitation. The frequencies should be selected such that the Lissajous figures produced cover the entire desired image field with no gaps.

The holder 1 preferably has a recess 13 through which an illuminating light beam 19 is directed onto the focusing lens system 12. The focusing lens system 12 focuses the illuminating light beam on a focus region, particularly on a focus point 23. Alternatively, the illuminating light beam 19 may be focused to form any desired focus region, for example a focus line.

FIG. 6 shows a plan view of a third embodiment of the first electromagnetic drive from which the arrangement of the coil arrangement 3 and the magnetic field arrangement 6 relative to one another can be seen particularly well. In particular, FIG. 6 shows in addition to the lower first magnetic element 6b a lower second magnetic element 8b which generates, with a corresponding upper second magnetic element (not shown), a second magnetic field that is parallel to the first magnetic field. The first coil lead 4 is wound to form a first coil 4a. The direction of the magnetic field that is generated inter alia by means of the two lower magnetic elements 6b, 8b, is characterised by a dot or a cross, respectively, in the corresponding magnetic element 6b, 8b. The arrows along the first coil lead 4 indicate the direction in which the first coil 4a is wound. When current flows through the first coil lead 4 the first coil 4a is pressed into or out of the first or second magnetic field depending on the direction of flow in the first coil 4a.

FIG. 7 shows a third embodiment of the first electromagnetic drive 2 which allows movement of the carrier body 10 and hence of the focusing lens system 12 in two directions within a plane. A second coil lead 26 is provided for this purpose. The second coil lead 26 comprises a second coil 26a, a third coil 26b, a fourth coil 26c and a fifth coil 26d. The carrier body 10 is formed by a printed circuit board on which the second to fifth coils 26a to 26d are formed by lithography.

In this embodiment the first coil lead 4 is also embodied with its first coil 4a on the carrier body 10.

The windings of opposing coils of the same coil lead are opposite one another. The effect of this is that when current flows through the second coil lead 26, for example, a force acts exclusively in one direction on the coils and hence on the carrier body 10 and focusing lens system 12. Depending on the direction of the current on the second coil lead 26 the carrier body 10 with the focusing lens system 12 then moves upwards or downwards in FIG. 7. By means of the flow of current through the first coil lead 4 the movement can be controlled perpendicularly thereto, namely to the right and left in FIG. 7. Alternatively, the movement upwards and downwards can also be converted by moving the sample 34. The scanning process may take place line by line or column by column or may also occur in any directions in space, for example in order to be able to show the processes along certain structures particularly graphically.

FIG. 8 shows a fourth embodiment of the first electromagnetic drive 2 which also allows movement of the focusing lens system 12 in two special directions within the plane. For this purpose the first electromagnetic drive 2 comprises in addition to the first and second lower magnetic elements 6b, 8b a third lower magnetic element 22b and a fourth lower magnetic element 24b, which generate a third and a fourth magnetic field, respectively, with corresponding upper third and fourth magnetic elements (not shown). In this embodiment the first coil lead 4 comprises the first coil 4a and a sixth coil 4b. The first and the sixth coil 4a, 4b are arranged opposite with respect to the focusing lens system 12. The first coil 4a penetrates partly into the first and second magnetic fields. The sixth coil 4b penetrates partly into the third and fourth magnetic fields. The second coil lead 26 comprises a seventh coil 26e and an eighth coil 26f. The seventh and eighth coils 26e and 26f are arranged opposite one another with respect to the focusing lens system 12. The seventh coil 26e penetrates at least partially into the second and fourth magnetic fields. The eighth coil 26f penetrates at least partially into the first and third magnetic fields.

FIG. 9 shows a scanning microscope which has as the scanning unit 31 the device for scanning an object, particularly a sample 34, described hereinbefore. The scanning microscope has a light source 29 which produces the illuminating light beam 19. The illuminating light beam 19 is collimated and is deflected through a beam splitter 30 onto the focusing lens system 12. The focusing lens system 12 meanwhile is fully illuminated from above so that for all the scanning positions the illuminating light beam 19 passes through the focusing lens system in the same direction. The carrier body 10 acts as a shutter or mask. The focusing lens system 12 directs a focused illuminating light beam 32 onto the sample 34 which is located on a slide 36. The first and sixth coils 4a, 4b of the first coil lead 4 are mounted on the carrier body 10 such that they each surround the edge of a recess 27 in the carrier body 10. The first magnetic field arrangement 6 and a second magnetic field arrangement 33 which comprises the upper and lower second magnetic elements are formed in one piece with a housing of the scanning unit 31, which may also be referred to as the device for scanning an object. A detection light beam 44 emanating form the sample 34 is directed through the beam splitter 30 onto a detection lens 46 which directs the detection light beam 34 through a detection shutter onto a detector 50. The detection light beam 44 is produced, inter alia, as a result of fluorescent effects in the sample 34, for example due to Raman effects and especially non-linear Raman effects. For assigning the measured values to the corresponding pixel positions, the same methods are used as in conventional confocal microscopy.

Microscopy methods in which the device according to the invention can be used, or effects that can be observed during such methods, include for example SRS (Stimulated Raman Scattering), FLIM (Fluorescent Lifetime Imaging), SHG (Second Harmonic Generation), FRAP (Fluorescent Recovery After Photo Bleaching), FRET (Fluorescent Resonance Energy Transfer) and FCS (Fluorescent Correlation Spectroscopy).

FIG. 10 shows an embodiment of the scanning microscope according to FIG. 9 in which the scanning unit 31 is mounted by means of vertical spring elements 68 to be movable perpendicular to the plane in which the carrier body 10 is movably mounted by a second electromagnetic drive 59. In particular, the scanning microscope in this embodiment comprises a third magnetic field arrangement 60 which is connected to a housing of the scanning microscope. The third magnetic field arrangement cooperates, via a vertical coil 62 coupled to a vertical carrier body 64, so as to move the entire scanning operation 31 in the direction perpendicular to the slide 36, independent of a flow of current through the vertical coil 62. In this way the focus point 23 within the object can be moved in the z direction. This makes it possible to scan not only a flat area but an entire volume optically. Alternatively, the sample may also be moved in the z direction.

FIG. 11 shows a detailed view of the carrier body 10 seen from above. The Figure shows the focusing lens system 12, the recesses 27 and the first and second coils 26a, 26b. In addition, the carrier body comprises two recesses 92. The recesses 92 are part of a simple position sensor which is shown in FIG. 12.

FIG. 12 shows the carrier body 10 with recesses 92 in the carrier body 10. A scattering disc 94 is arranged between a light source 95 of the position sensor and the carrier body 10. Beyond the carrier body 10 is disposed a light detector 96 with four different photosensitive regions. The light from the light source 95 of the position center projects the light through the recess 92 onto the light detector 96. Depending on the position of projection the positions of the carrier body 10 can be determined. Thus, an actual position of the carrier body 10 can be matched particularly precisely to a desired position by means of a regulating loop. The light detector 96 may be, for example, a position-sensitive silicon detector (PSD) with a 4-quadrant diode. Alternatively, the position sensor may also comprise a capacitive, inductive or magneto resistance sensor (AMR/GMR sensor). Preferably, two position sensors are arranged symmetrically with respect to the position of the focusing lens system 12.

The invention is not limited to the embodiments recited. For example, any combination of coils and magnetic fields that allows the carrier body to be moved in the plane is possible.

In particular, each of the coils may have its own coil lead, as a result of which the carrier body can be deflected or even rotated even more precisely, for example in order to compensate for any accidental rotation. Moreover, permanent magnets may also be used to produce the magnetic fields. The focusing lens system 12 need not be illuminated from above. Other light sources may also be provided. Between the focusing lens system 12 and the sample 34 an immersion medium may be provided, particularly an internal immersion medium inside the scanning unit and/or an external immersion medium outside the scanning unit. Alternatively or additionally the focusing lens system 12 may also comprise a lens that is curved inwards, viewed from the sample 34.

LIST OF REFERENCE NUMERALS

1 Holder
2 First electromagnetic drive
3 Coil arrangement
4 First coil lead
4a First coil
4b Sixth coil
5 First spring element
6 First magnetic field arrangement
6a Upper first magnetic element
6b Lower first magnetic element
7 Second spring element
8b Lower second magnetic element
9 Third spring element
10 Carrier body
11 Fourth spring element
12 Focusing lens system
13 Recess holder
14 Magnetic field lines
15 First magnetic coil
16 First force vector
17 Second magnetic coil
18 Second force vector
19 Illuminating light beam
20 Scanning microscope
21 Coil holder
22b Lower third magnetic element
23 Focus point
24b Lower forth magnetic element
26 Second coil lead
26a Second coil
26b Third coil
26c Forth coil
26d Fifth coil
26e Seventh coil
26f Eighth coil
27 Recess carrier body
30 Beam splitter
31 Scanning unit
32 Focused illuminating light beam
33 Second magnetic field arrangement
34 Sample
36 Slide
44 Detection light beam
46 Detection lens
48 Detection shutter
50 Detector
59 Second electromagnetic drive
60 Third magnetic field arrangement
62 Vertical coil
64 Vertical carrier body
68 Vertical spring element
92 Recess in the carrier body
94 Scattering disc
95 Light source position sensor
96 Light detector

What is claimed is:

1. A device for scanning an object, the device comprising:
a carrier body movable in a device plane;
an optical element held by the carrier body, wherein the optical element focuses an illuminating light beam onto a first object plane of the object, the first object plane being parallel to the device plane;
a first electromagnetic drive which moves the carrier body with the optical element transversely with respect to a center axis of the illuminating light beam in a reference position of the illuminating light beam and moves a focus region of the illuminating light beam within the first object plane; and
a position sensor arranged to detect the position of the carrier body to thereby determine the position of the optical element;
wherein the position sensor comprises a recess in the carrier body, a light source and a light detector, the light from the light source passing through the recess and onto the light detector, and the projection of the light on the light detector moving accordingly as a result of the movement of the support body, so that the actual position of the carrier body is detected.

2. The device according to claim 1, wherein the carrier body is mounted to be movable in the device plane by a parallel spring arrangement.

3. The device according to claim 2, wherein the parallel spring arrangement comprises two or more parallel spring linkages.

4. The device according to claim 3, wherein at least one of the parallel spring linkages forms a current supply line for the electromagnetic drive.

5. The device according to claim 1, wherein the carrier body comprises a printed circuit board on which at least one drive component of the first electromagnetic drive is formed.

6. The device according to claim 1, wherein the first electromagnetic drive comprises a first drive component including a coil arrangement and a second drive component including a magnetic field arrangement generating least one magnetic field, wherein one of the first and second drive components is fixedly connected to the carrier body for movement with the carrier body and the other of the first and second drive components is fixed in position.

7. A device for scanning an object, the device comprising:
a carrier body movable in a device plane;
an optical element held by the carrier body, wherein the optical element focuses an illuminating light beam onto a first object plane of the object, the first object plane being parallel to the device plane; and
a first electromagnetic drive which moves the carrier body with the optical element transversely with respect to a center axis of the illuminating light beam in a reference position of the illuminating light beam and moves a focus region of the illuminating light beam within the first object plane;
wherein the first electromagnetic drive comprises a first drive component including a coil arrangement and a second drive component including a magnetic field arrangement generating least one magnetic field, wherein one of the first and second drive components is fixedly connected to the carrier body for movement with the carrier body and the other of the first and second drive components is fixed in position; and
wherein the magnetic field arrangement comprises a first magnetic field device generating a first magnetic field and a second magnetic field device spaced from the first magnetic field device and generating a second magnetic field directed in an opposite direction to the first magnetic field, and wherein the coil arrangement comprises a first coil lead having a first coil, a center of the first coil being located between the first and second magnetic field devices, the first coil projecting partly into the first magnetic field and partly into the second magnetic field.

8. The device according to claim 7, wherein the coil arrangement comprises a second coil lead having a second coil, a third coil, a fourth coil and a fifth coil, wherein two of the second through fifth coils are wound in a same direction of rotation while another two of the second through fifth coils are wound in opposite directions of rotation to one another,
   wherein the two coils wound in the same direction of rotation are arranged on a same side of the two magnetic fields and one of these two coils projects partially into the first magnetic field and the other of these two coils projects partially into the second magnetic field, and
   wherein the other two coils wound in opposite directions are arranged on another side of the two magnetic fields and one of these other two coils projects into the first magnetic field and the other of these other two coils projects into the second magnetic field; and
   wherein none of the second through fifth coils is arranged on a side of the two magnetic fields where the first coil is arranged.

9. The device according to claim 7, wherein the magnetic field arrangement comprises a third magnetic field device which generates a third magnetic field opposite the first magnetic field, and a fourth magnetic field device which generates a fourth magnetic field opposite the second magnetic field, the four magnetic field devices being arranged at the corners of a rectangle and each of the magnetic field devices along the rectangle being adjacent to a magnetic field device having an opposing magnetic field,
   wherein the first coil lead comprises a sixth coil which is wound in the opposite direction of rotation to the first coil, a center of the sixth coil being located between the third and fourth magnetic field devices and the sixth coil projecting partly into the third magnetic field and partly into the fourth magnetic field, and
   wherein the coil arrangement comprises a second coil lead having a seventh coil and an eighth coil wound in opposite directions of rotation to one another, a center of the seventh coil being located between the first and third magnetic field devices and the seventh coil projecting into the first and third magnetic field devices, and a center of the eighth coil being located between the second and fourth magnetic field devices and the eighth coil projecting into the second and fourth magnetic field devices.

10. The device according to claim 1, wherein the carrier body is mounted to be movable perpendicular to the device plane, and the device further comprises a second electromagnetic drive which moves the carrier body perpendicular to the device plane, so that the focus point of the illuminating light beam is moveable within a second object plane at a predefined spacing from the first object plane, parallel to the device plane.

11. A scanning microscope comprising:
   a light source generating an illuminating light beam, the illuminating light beam having a reference position;
   a carrier body movable in a device plane and movable perpendicular to the device plane;
   an optical element held by the carrier body, wherein the optical element focuses the illuminating light beam onto a first object plane of the object, the first object plane being parallel to the device plane;
   a first electromagnetic drive which moves the carrier body with the optical element transversely with respect to a center axis of the illuminating light beam in the reference position of the illuminating light beam and moves a focus region of the illuminating light beam within the first object plane;
   a second electromagnetic drive which moves the carrier body perpendicular to the device plane, so that a focus point of the illuminating light beam is moveable within a second object plane at a predefined spacing from the first object plane, parallel to the device plane; and
   a position sensor arranged to detect the position of the carrier body to thereby determine the position of the optical element, wherein the position sensor comprises a recess in the carrier body, a light source and a light detector, the light from the light source passing through the recess and onto the light detector, and the projection of the light on the light detector moving accordingly as a result of the movement of the support body, so that the actual position of the carrier body is detected;
   wherein the device focuses the illuminating light beam onto different object points in the first or the second object plane.

12. A method of operating a device for scanning an object comprising the step of:
   actuating a first electromagnetic drive of the device such that a carrier body of the device, connected to a drive component of the electromagnetic drive, and holding an optical element that focuses an illuminating light beam onto a focus region of an object plane, is moved parallel to the object plane and in this way the focus region of the illuminating light beam is moved within the object plane; and
   detecting the position of the carrier body using a position sensor to thereby determine the position of the optical element, wherein the position sensor comprises a recess in the carrier body, a light source and a light detector, the light from the light source passing through the recess and onto the light detector, and the projection of the light on the light detector moving accordingly as a result of the movement of the support body, so that the actual position of the carrier body is detected.

* * * * *